(12) United States Patent
Ramachandran

(10) Patent No.: US 6,768,835 B2
(45) Date of Patent: Jul. 27, 2004

(54) TUNABLE MODE-CONVERTERS USING FEW MODE FIBERS

(75) Inventor: Siddharth Ramachandran, Hoboken, NJ (US)

(73) Assignee: Fitel USA Corp, Norcross, GA (US)

( * ) Notice: Subject to any disclaimer, the term of this patent is extended or adjusted under 35 U.S.C. 154(b) by 141 days.

(21) Appl. No.: 10/234,289

(22) Filed: Sep. 4, 2002

(65) Prior Publication Data

US 2004/0042714 A1 Mar. 4, 2004

(51) Int. Cl.$^7$ .............................. G02B 6/26; G02B 6/34
(52) U.S. Cl. ........................................... 385/28; 385/37
(58) Field of Search .............................. 385/27, 28, 30, 385/37

(56) References Cited

U.S. PATENT DOCUMENTS

| | | | | |
|---|---|---|---|---|
| 6,317,538 B1 | * | 11/2001 | Shigehara et al. | 385/37 |
| 6,400,865 B1 | * | 6/2002 | Strasser et al. | 385/28 |
| 6,430,342 B1 | * | 8/2002 | Kim et al. | 385/37 |

* cited by examiner

Primary Examiner—John D. Lee
Assistant Examiner—Tina M Lin
(74) Attorney, Agent, or Firm—Peter V. D. Wilde

(57) ABSTRACT

The specification describes optical mode converters wherein coupling is made between a fundamental, or near fundamental, propagation mode and the next, or closely adjacent, higher order mode (HOM). Both modes propagate in the core of the optical fiber, thus maintaining efficient transmission through the mode converter. Mode coupling is effected using a long period grating (LPG) and the strength of the mode coupling is dynamically varied by changing the period of the grating or by varying the propagation constants of the two modes being coupled. The period of the grating is varied by physically changing the spacing between grating elements, for example by changing the strain on the grating to physically stretch the LPG. The propagation constants of the modes can be varied using any method that changes the refractive index of the fiber containing the LPG, for example, by changing the temperature, or electrically changing the index using the electro-optic effect. In every case the two modes being coupled are core modes with high propagation efficiency.

12 Claims, 5 Drawing Sheets

TUNABLE MODE-CONVERTERS USING FEW MODE FIBERS

FIELD OF THE INVENTION

This invention relates to optical signal mode converters with very high efficiency tuning capability.

BACKGROUND OF THE INVENTION

Tunable broadband mode-converters play an important role in WDM optical communication systems. They may be used to dynamically convert a lightwave signal propagating in one mode of a few-mode fiber, into another spatial mode. Such coupling is attractive to alter the path the lightwave signal takes, because the alternate path (defined by another spatial mode in the fiber) may have preferred dispersion, nonlinearity, or amplification properties. An example of this is a higher-order-mode dispersion compensator, where light in an entire communications band is switched from an incoming $LP_{01}$ mode to a higher-order-mode (HOM) such as the $LP_{11}$ or $LP_{02}$ mode. See for example: C. D. Poole et al., *J. Lightwave Tech.*, vol 12, pp.1746–1758 (1994); S. Ramachandran, et al., *IEEE Photon. Tech. Lett.*, vol 13, pp. 632–634 (2001); A. H. Gnauck et al., *Proc. Opt. Fiber Comm.*, PD-8 (2000); U.S. Pat. Nos. 5,185,827, 5,802,234.

In a general sense, long-period gratings are mode-conversion devices that provide phase-matched coupling to transfer power from one mode of an optical fiber to another. (See, e.g., J. N. Blake, B. Y. Kim and H. Shaw, "Fiber-Optic Modal Coupler Using Periodic Gratings," *Opt. Lett.* 11,177 (1986); J. N. Blake, B. Y. Kim, H. E. Egan, and H. J. Shaw, "All-Fiber Acusto-Optic Frequency Shifter," *Opt. Lett.* 11, 389(1986); and J. N. Blak, B. Y. Kim, H. E. Egan, and H. J. Shaw, "Analysis of Intermodal Coupling in a Two-Mode Fiber with Periodic Microbends," *Opt. Lett.* 12, 281(1987)). This has proven to be especially useful for coupling between a guided mode and a cladding mode of ordinary transmission fibers, to create wavelength selective loss (See, e.g., M. Tachibana, R. I. Laming, P. R. Morkel and D. N. Payne, "Erbium-Doped Fiber Amplifier with Flattened Gain Spectrum," *IEEE Phot. Tech. Lett.* 3, 118(1991)). In optical communications systems, LPGs have been used extensively for realizing devices that offer wavelength-selective attenuation of a WDM communications signal.

Most of the applications for LPGs have concentrated on static wavelength attenuation. Dynamic tuning of the spectral characteristics of LPGs has been proposed, and a variety of dynamic tuning techniques have been demonstrated. LPGs that couple the core mode to a cladding mode can be tuned dynamically by modulating the refractive index of an outer or inner cladding material that is interrogated by a cladding mode of the fiber. The refractive index of such cladding materials can be varied by temperature, the electro-optic effect or some nonlinear optical effect, depending on the nature of the cladding material used. Alternately, the LPGs may be strained by piezoelectric packages, simple motion control housings or magnetically latchable materials, to tune the core-to-cladding resonance. All these tuning techniques have been applied to LPGs coupling core modes to cladding modes, and offer tunable attenuation over a limited, narrow spectral range. The tuning mechanisms described above serve to shift the spectral response of LPGs from one wavelength to another. While these techniques are useful for tuning the wavelength selective attenuation in a fiber-optic system, they cannot be used for broadband mode-conversion schemes. This is because the devices transform light into a cladding mode, and cladding mode transmission is known to be inefficient. Thus these devices are not useful in systems that propagate signals over long lengths, as are required for devices such as the HOM dispersion compensators. In addition, the spectral width of mode coupling with current tunable LPGs is undesirably narrow. Typical bandwidths are ~1 nm for 99% mode-conversion, while a practical device would need more than a 40 nm bandwidth. While chirped LPGs have been proposed to enhance the bandwidth, the approach introduces an inherent trade-off between bandwidth and strength of mode-conversion. Most importantly, the tuning that is most desirable for dynamic filters is in the strength of the coupling, and not the resonant wavelength. The devices described above provide only the latter form of tunability.

Broadening the bandwidth of LPGs by coupling to a higher-order cladding mode has been described by V. Grubsky et al., "Long period fiber gratings with variable coupling for real-time sensing applications, *Optics Lett.*, Vol. 25, p. 203 (2000). In this device, greater than 50-nm coupling has been achieved, albeit with weak coupling strengths. The coupling strength was tuned by temperature or strain, but the device suffered from the drawback that it coupled to a cladding mode, which is lossy in nature. The spectral characteristics of this device were controlled by the silica cladding of a fiber. This structure is not amenable to arbitrary control, and thus the spectral shape or characteristics could not be altered, as would be required of a practical mode-converter.

Thus, there exists the need for a fiber-grating device that can offer strong broadband coupling, preferably over bandwidths exceeding 30 nm, whose coupling strength is tuned by temperature, strain, the electro-optic effect, the nonlinear optic effect, or any other means that modifies the refractive index of a material. A practical device would offer mode-conversion such that the converted mode can be propagated for long distances without significant attenuation.

STATEMENT OF THE INVENTION

According to the invention, a few mode fiber is used for the mode converter, and coupling is made between a fundamental, or near fundamental, propagation mode and the next, or closely adjacent, higher order mode (HOM). Both modes propagate in the core of the optical fiber, thus maintaining efficient transmission. Mode coupling is effected using a long period grating (LPG) and the strength of the mode coupling is dynamically varied by changing the period of the grating or by varying the propagation constants of the two modes being coupled. The period of the grating is varied by physically changing the spacing between grating elements, for example by changing the strain on the grating to physically stretch the LPG. The propagation constants of the modes can be varied using any method that changes the refractive index of the fiber containing the LPG, for example, by changing the temperature, electrically changing the index using the electro-optic effect, or optically changing the index using the non-linear optic effect. In every case the two modes being coupled are core modes with high propagation efficiency.

In the following description an LPG formed in a few mode fiber is referred to as an HOM-LPG.

DETAILED DESCRIPTION

Figure 1:
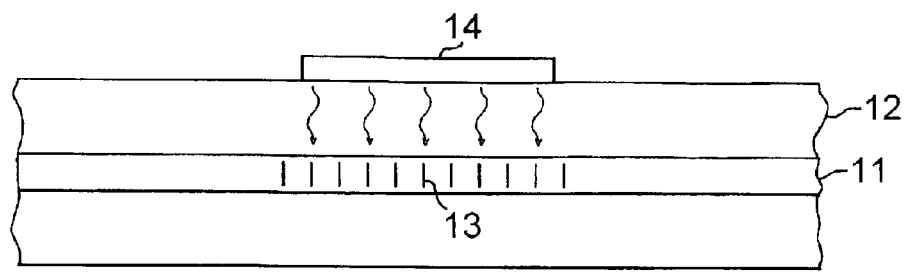
FIG. 1 is a schematic representation of a HOM-LPG mode converter according to the invention.

The basic structure of the HOM-LPG mode converter is illustrated in FIG. 1. The optical fiber is shown with core 11 and cladding 12. The LPG is shown at 13. A temperature control element for tuning the HOM-LPG is shown at 14. The temperature control means is typically a thermoelectric device for either heating or cooling the core of the optical fiber.

Figure 2:
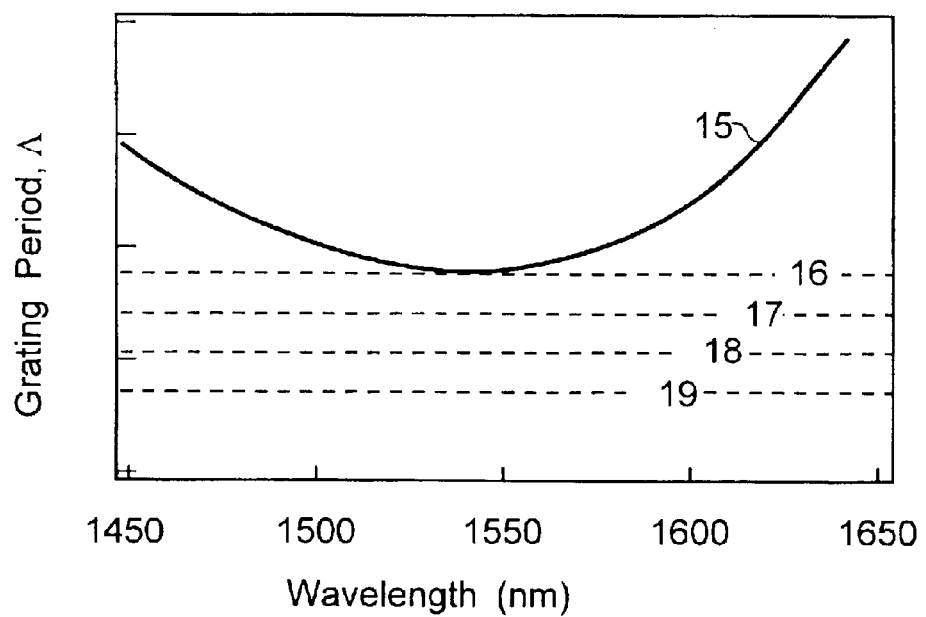
FIG. 2 is a plot of wavelength vs. LPG period showing the spectral properties of an HOM-LPG.

FIG. 2 shows the phase-matching curve, 21, that determines the spectral properties of LPGs induced in HOM fibers. An important feature in the phase matching curve for these specially designed HOM fibers is the existence of a turn-around-point (TAP), shown on the curve. These fibers support more than one spatial mode in the core region. When the LPG grating period is chosen to couple at the TAP, shown by the line 22 in FIG. 2, large bandwidth mode-coupling is achieved.

A TAP in an optical fiber exists when two modes (or more) have group indices that are essentially the same. The group index of a propagating mode is a well-known and well-defined optical parameter. It may be represented by:

$$n_g = n - \lambda dn/d\lambda$$

where $n_g$ is the group index, n is the refractive index and $\lambda$ is the wavelength. For the purpose of defining the conditions useful for practicing the invention, one of these is the existence of a TAP in the fiber containing the LPG. Another is the ability of the fiber to support at least two core-guided modes. Core-guided modes are those in which the predominant energy envelope of the propagating mode resides in the core region of the optical fiber. In a typical fiber, greater than 60% of the light energy in a core-guided mode propagates in the center 60 microns of the glass fiber. In contrast cladding modes have more than 40% of the energy outside this region.

Figure 3:
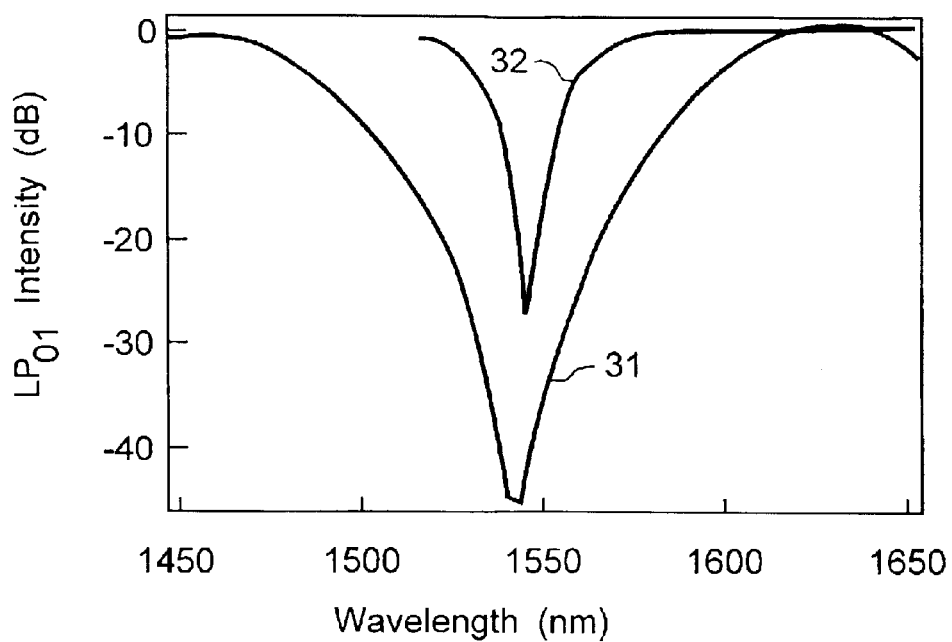
FIG. 3 is a plot of intensity vs. wavelength showing the coupling efficiency of an HOM-LPG, with curves comparing the HOM-LPG with a conventional LPG.

FIG. 3, shows the typical spectrum, 31, of light remaining in the $LP_{01}$ mode of the HOM fiber after the coupled $LP_{02}$ mode is stripped out, and also shows the corresponding spectrum of conventional LPGs, 32. It is apparent that bandwidth improvements by a factor of 60 or more are achieved with HOM fibers.

Figure 4:
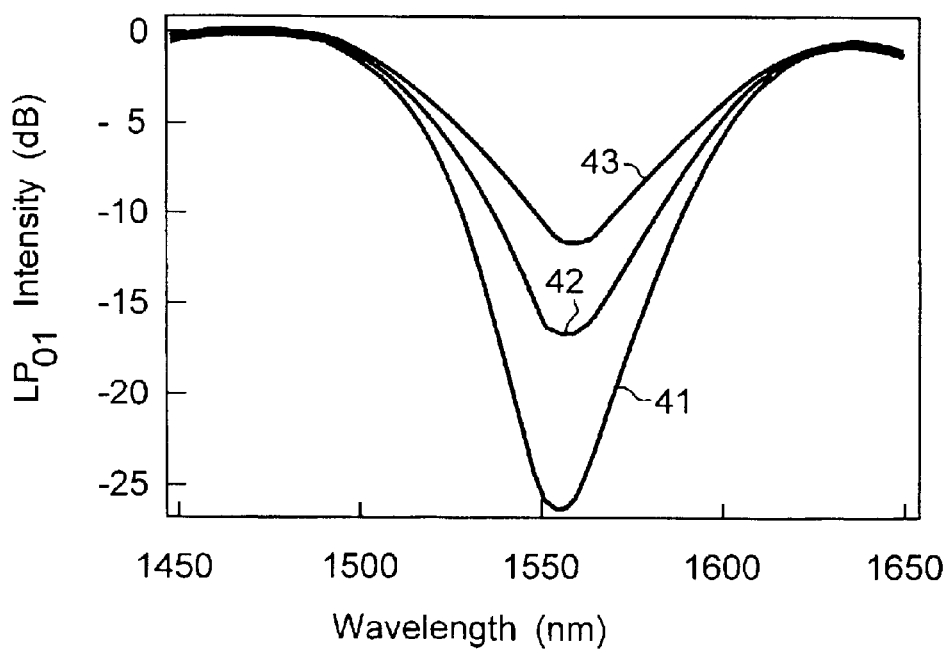
FIG. 4 is a plot of intensity vs. wavelength showing the coupling efficiency of HOM-LPGs with different grating spacing.

FIG. 2 also shows additional curves representing grating periods at slight deviations from the TAP grating period, i.e. curves 23, 24, and 25. FIG. 4 shows the LPG spectra for gratings with these grating periods, i.e. curves 41, 42, and 43, respectively. As is evident, slight deviations from the TAP grating period leads to changes in the coupling strength of the grating. Note that while the strength of coupling changes, the spectral shape remains nominally the same. This is in contrast to conventionally tuned LPGs, where tuning shifts the resonant wavelength of the spectrum.

The origin of this effect can be understood by realizing that the coupling efficiency, η, of a uniform LPG (that determines the amount of light coupled by the LPG) is given by:

$$\eta = (\kappa L)^2 \cdot \frac{\sin^2\left(\sqrt{(\kappa L)^2 + (\delta L)^2}\right)}{(\kappa L)^2 + (\delta L)^2} \tag{1}$$

where κ is the coupling coefficient, which is proportional to the amount of index change induced in the fiber, L is the length of the grating, and δ is a detuning parameter, given by:

$$\delta = \frac{1}{2}\left(\frac{2\pi}{\lambda}\Delta n - \frac{2\pi}{\Lambda}\right) \tag{2}$$

where λ is the wavelength, Λ is the grating period, and Δn is the difference in the effective refractive indices between the $LP_{01}$ and $LP_{02}$ modes, respectively. A resonance occurs, and strong coupling is achieved when the condition δ=0 is satisfied. Eq. 1 indicates that the coupling strength decreases with a Sinc functional dependence, as δ deviates from zero. Equation 2 represents the resonance condition for a LPG, and the phase matching curve shown in FIG. 2 is a trace of the wavelength, λ versus the grating period Λ when the detuning, δ=0. The line 21 in FIG. 2 represents the grating period when the grating couples at the TAP—that is, when the δ=0 condition is satisfied at the TAP. The lines 23, 24, and 25 in FIG. 2, represent different grating periods, none of which intersects the phase matching curve, 21. From Eq. 1 and 2, we can deduce that for grating periods represented by the lines 23, 24, and 25, δ is larger than zero at all wavelengths. This implies that the coupling strength is less than optimal at all wavelengths. In addition, it is apparent from FIG. 2 that δ becomes progressively larger, for the curves 23, 24, and 25, respectively. Likewise, the corresponding spectrum in FIG. 4 shows that curves 41, 42, and 43 show progressively weaker coupling. Further, for all grating periods (represented by lines 22, 23, 24, and 25), FIG. 2 shows that δ is minimum at the TAP wavelength. Since Eq. 2 indicates that maximum coupling is obtained for minimum δ, FIG. 2 indicates that all gratings would yield maximum coupling at the TAP wavelength. This is indeed the case, as is evident upon inspection of FIGS. 3 and 4.

Figure 5:
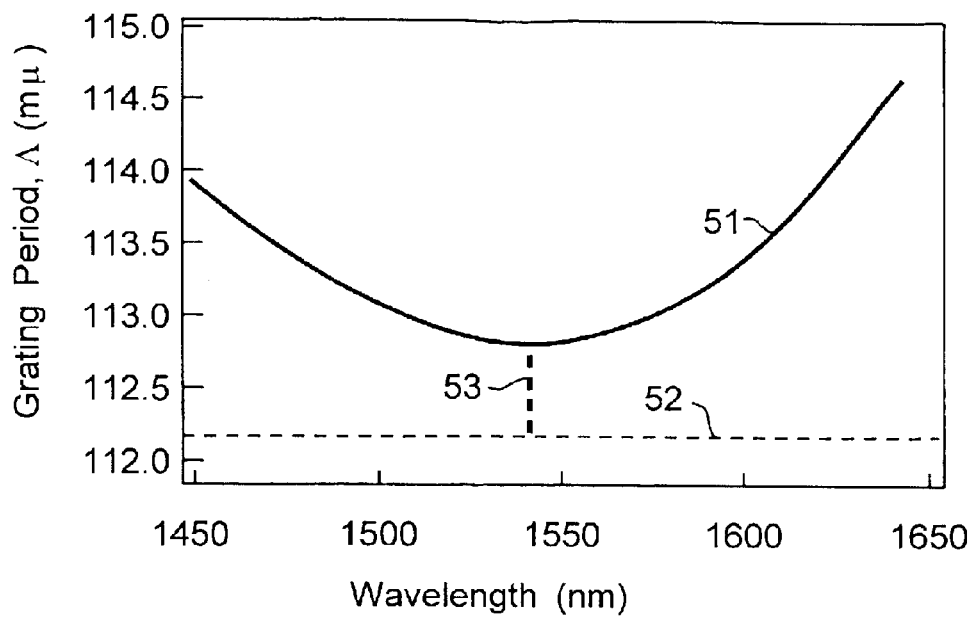
FIG. 5 is a plot of wavelength vs. LPG period illustrating a graphical relationship for the strength of mode coupling.
Figure 6:
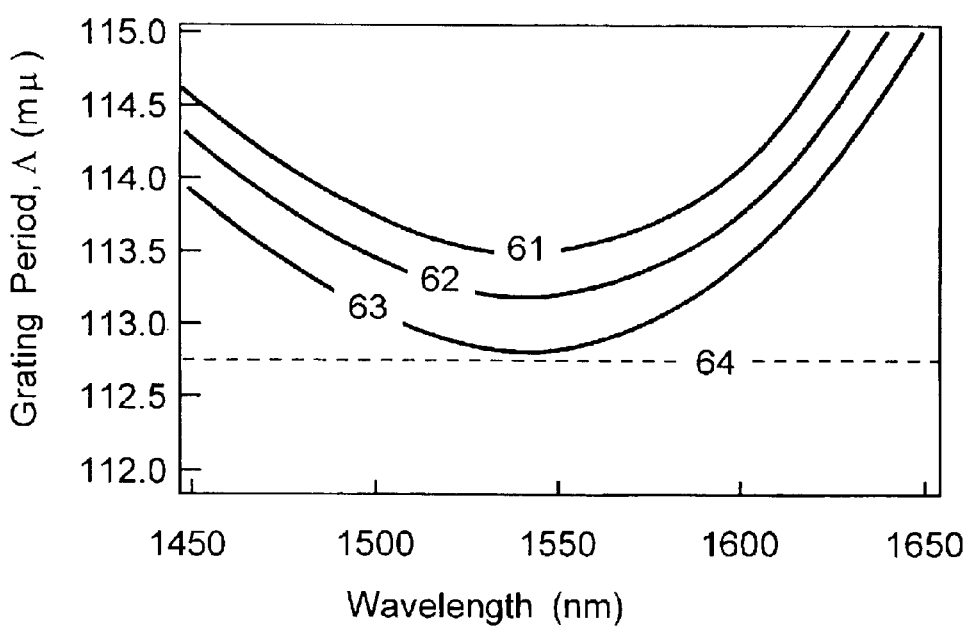
FIG. 6 is a plot of wavelength vs. LPG period showing the effect on the phase matching curve of varying the temperature of the grating.
Figure 7:
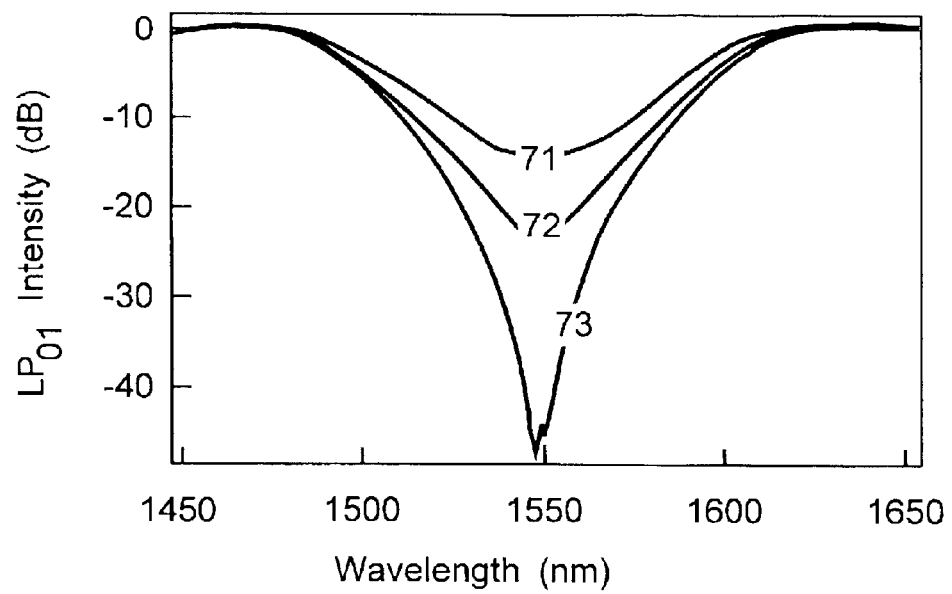
FIG. 7 is a plot of wavelength vs. mode intensity showing the effect on coupling strength of varying the temperature of the grating.

Thus, as general rule, and with reference to FIG. 5, we infer that the coupling strength of a grating can be deduced by inspecting the phase matching curve 51 for the particular fiber (e.g. FIG. 2), and drawing a horizontal line 52 on it that represents the grating period. The relative strength of coupling at any wavelength is then proportional to the length of a line 53 connecting the phase matching curve 51 and the grating line 52. This rule is strictly true for Gaussian apodised gratings, and is approximately true for uniform gratings. Thus, the coupling strength of this new class of gratings may be changed without perturbing their spectral shapes. Strength tuning can be achieved by strain, which serves to change the grating period, as is illustrated in FIG. 2 (spectra in FIG. 4). Alternately, the grating period can be held constant, and the phase matching curve can be moved. The phase matching curve is determined by the waveguide properties (such as the difference in effective indices of the two modes, $\Delta n$, as shown in Eq. 2). This may be changed by any means that changes the refractive index profile of the fiber. FIG. 6 shows the shift in the phase matching curve as result of changing the ambient temperature from $T_1$ to $T_2$ to $T_3$. Curve 61 is for $T_1$, curve 62 is for $T_2$, and curve 63 is for $T_3$. The grating period, represented by curve 64, is held constant. Since only the relative distance between the phase matching curves 61, 62 and 63 and the grating period line, 64, is required to determine the level of coupling, the changes represented here should produce similar effects to straining (FIGS. 2, 3 and 4). FIG. 7 shows the grating spectra at temperatures $T_1$, $T_2$, and $T_3$. In FIG. 7, curve 71 is for $T_1$, curve 72 is for $T_2$, and curve 73 is for $T_3$. The expected decrease in coupling strength is evident, as the grating period and the TAP of the phase matching curve become more removed.

FIG. 5 shows, for example, a grating period departure from the TAP point that is approximately 0.5% ((112.8−112.2)/112.8). FIG. 2 indicates that the grating period (or the TAP point) may be set as desired at any of several relative positions. However, in the practice of the invention reasonably efficient coupling will be desired. To this end, the TAP and the grating period $\Lambda$, for the lower order mode in the mode converter, should be within 5%, and preferably within 2%. It should be understood that these ranges apply to both the case of FIG. 2 ($\Lambda$ at or below the TAP minima) and FIG. 8 ($\Lambda$ at or above TAP minima).

While temperature was used in FIGS. 6 and 7 as the control parameter to shift the phase matching curve, the effect is also realized by any physical mechanism that dynamically alters the refractive index profile of the fiber containing the HOM-LPG. These mechanisms include, but are not limited to, stress-optic, thermo-optic, nonlinear-optic, acousto-optic or electro-optic effects that alter the refractive indices of one or more layers of material used in defining the core or cladding environment of an optical fiber.

Figure 8:
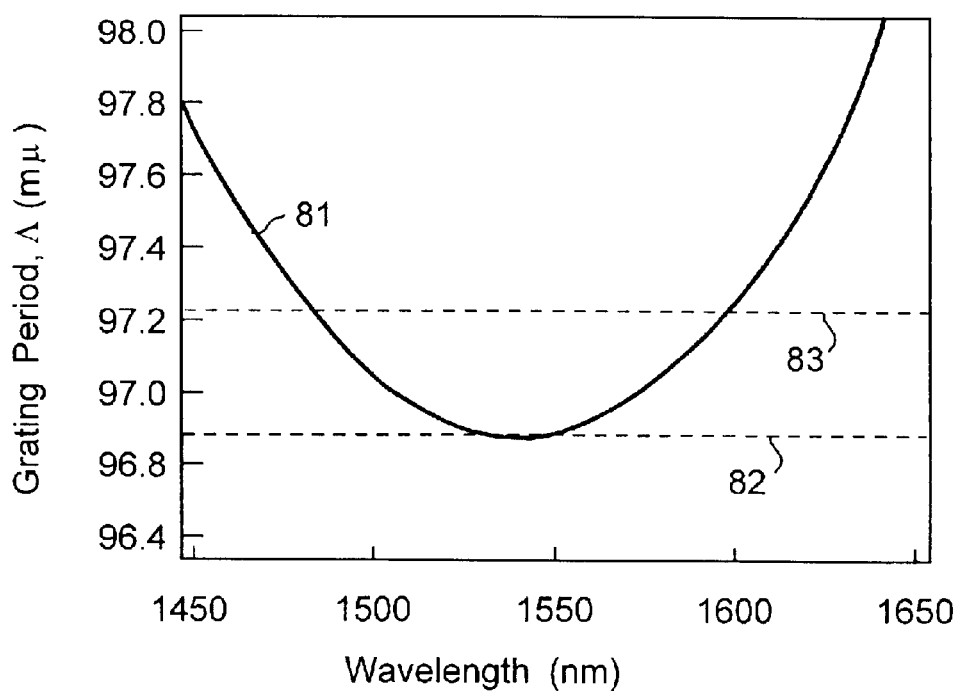
FIG. 8 is a plot of wavelength vs. LPG period to compare the case of a grating spacing at the minima in the phase matching curve (FIG. 1) with a grating spacing the intersects the phase matching curve.
Figure 9:
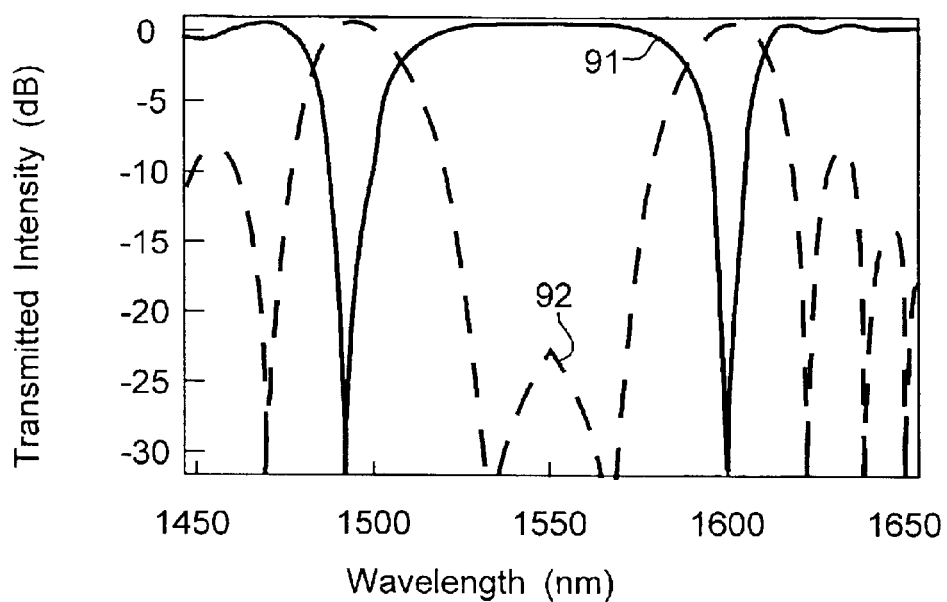
FIGS. 9 and 10 are plots of wavelength vs. transmitted (mode) intensity for the two cases shown in FIG. 8.
Figure 10:
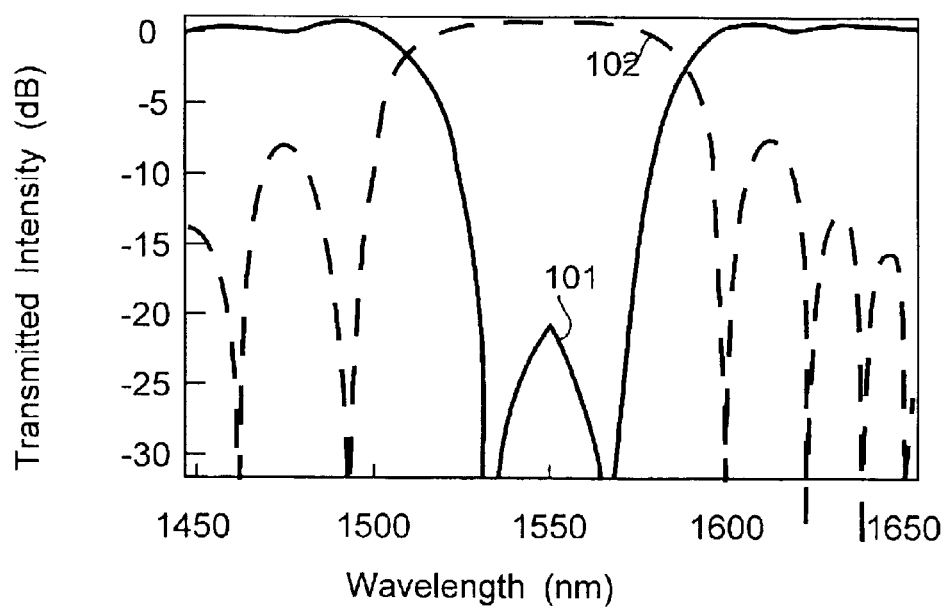

The previous examples and illustrations show how a fiber with a TAP in its phase matching curve can be used to realize a mode-coupler with variable strength by shifting the grating period away from the phase matching curve. The same concept holds when the grating period is shifted to intersect the phase matching curve at two discrete points, as shown in FIG. 8. This figure shows a phase matching curve, 81, with a TAP at 1540 nm, and two lines, 82 and 83, representing two distinct grating periods, 96.885 $\mu$m, line 82, and 97.215 $\mu$m, line 83. FIGS. 9 and 10 show the spectral response for the two modes that are coupled by the LPG, the $LP_{01}$ and the $LP_{02}$ modes. The spectral response in FIG. 9 corresponds to the case (FIG. 8) where the grating period is at line 82, i.e. well removed from the TAP. FIG. 10 gives corresponding spectral response for the case with the grating spacing at line 83 of FIG. 8, i.e. where the grating spacing is set at the TAP in the phase matching curve. Note that in FIG. 8, the grating period represented by line 82, intersects the phase matching curve at two wavelengths. In addition, following the insight gained from FIG. 5 and Eqs. 1 and 2, we infer that a grating at this period offers very little coupling at the TAP wavelength region, since $\delta \neq 0$ (see Eq. 6 and discussion in relation to FIG. 5), at the TAP. Thus, very little coupling is expected. This is observed in the spectra of FIG. 9. The curve 91 represents the light in the $LP_{01}$ mode at the output of the LPG. The spectrum shows resonances at two wavelengths, approximately 1490 nm, and approximately 1600 nm. The resonances correspond to the wavelengths where the phase matching curve 81 of FIG. 8 intersects the grating period curve 82. On the other hand, in the wavelength region close to the TAP, between approximately 1530 nm and 1565 nm, the transmitted intensity in the $LP_{01}$ mode is almost 0 dB, corresponding to full transmission. Since a substantial portion of the light remains in the $LP_{01}$ mode for this case, no significant power is expected to reside in the $LP_{02}$ mode at the output of this LPG. This is illustrated by curve 92 of FIG. 9, which shows that the transmitted power in $LP_{02}$ mode is less than −20 dB in the wavelength range of 1530 nm to 1656 nm. FIG. 10 shows the spectral response obtained with an LPG whose grating period is represented by line 83 in FIG. 8, i.e. where the grating period is set at the TAP in the phase matching curve. FIG. 10 shows that a strong broadband resonance is obtained, such that the power in the $LP_{01}$ mode, represented by curve 101, is reduced to levels below −20 dB in the wavelength region close to the TAP (1530 nm to 1565 nm). At the same time the power in the $LP_{02}$ mode, represented by curve 102, is close to 0 dB (unity transmission) in the same wavelength range. This example illustrates that the relative position of the grating period with respect to the phase matching curve is not limited by the relationship shown in FIGS. 2, 5, and 6, i.e. where the grating period is separated from the phase matching curve, but that broadband variable coupling can be achieved by shifting the relative positions of the phase matching curve and the grating period in either direction. The example illustrated in FIGS. 8–10 also indicates that this concept may be used to build "ON/OFF" switches to shuffle light between various modes of a fiber.

While the foregoing illustrations pertain to mode coupling between the $LP_{01}$ and the $LP_{02}$ mode, the same concept can be generalized to LPGs that offer coupling to other core-guided modes. Both modes of interest may be "higher order" modes, for example the $LP_{11}$ mode and the $LP_{02}$ mode. Alternatively, coupling may be produced between more than one mode simultaneously. For example, intended coupling may occur between mode $LP_{01}$, and both $LP_{02}$ and $LP_{11}$. In this context, the choice of the kind of LPG used to fabricate these devices would depend on the preferred modes of choice. It may be preferable to use symmetric gratings (such as UV-induced LPGs) for coupling between the fundamental ($LP_{01}$ mode) and a symmetric mode (such as the $LP_{02}$ mode). On the other hand, it may be preferable to use asymmetric gratings, such as microbend LPGs induced by pressing corrugated surfaces on the HOM fiber, or by acousto-optic excitation, for coupling the fundamental mode with an anti-symmetric mode (such as the $LP_{11}$ mode) of the HOM fiber.

As noted earlier, several applications may be envisaged for a mode-converter with variable coupling. Of particular interest are adjustable dispersion compensators. These are described in detail in my co-pending application filed of even date herewith entitled: "ADJUSTABLE DISPERSION COMPENSATOR WITH FEW MODE FIBERS AND SWITCHABLE MODE CONVERTERS" which is incorporated herein by reference. In these devices one or more switchable HOM-LPGs may be combined with specified lengths of HOM fiber. The lengths of HOM fibers possess different amounts of dispersion in different spatial modes The switchable mode converter may then be used as a means of adjusting the amount of dispersion accumulated by the lightwave signal by preferentially directing the signal into a spatial mode with desired dispersion properties. This yields a tunable dispersion device.

Conventional LPGs are used as variable optical attenuators. These find applications in, for example, WDM systems for channel equalizers. They may also be used as modulators. In either case the HOM-LPG devices described above may offer equivalent functions but with higher efficiency and versatility. The LPG device may be constructed such that the higher order mode is always attenuated at the output of the LPG. This can be achieved by bending the fiber, or by adding mode-stripping tapers in the HOM fiber, after the LPG. Varying the strength of the coupling leads to varying loss values, since only the $LP_{01}$ mode is transmitted through the device.

The devices described above may also be used as simple 2×2 routers and/or switches. The switchable LPG of the invention can be combined with a mode-selective fused fiber coupler to extract the HOM out of the fiber, at the output of the LPG. Thus, the converted light can be directed into another fiber, thus achieving the functionality of 2×2 routing and switching.

The LPGs described here may be formed by various techniques. A common approach is to write the gratings into a Ge doped fiber using UV light. See, e.g., A. M. Vengsarkar, P. J. Lemaire, J. B. Judkins, T. Erdogan, and J. E. Sipe, "Long-Period Fiber Gratings as Band-Rejection Filters," *J. Lightwave Tech.*, 14, 58(1996); A. M. Vengsarkar, J. R. Pedrazzani, J. B. Judkins, P. J. Lemaire, N. S. Bergano, and C. R. Davidson, "Long-Period Fiber-Grating-Based Gain Equalizers," *Opt. Lett.*, 21, 336(1996); and J. A. Rodgers, R. J. Jackman, G. M. Whitesides, J. L. Wagener, and A. M. Vengsarkar, "Using Microcontact Printing to Generate Amplitude Photomasks on the Surfaces of Optical Fibers: A Method for Producing In-Fiber Gratings," *Appl. Phys. Lett.* 70,7(1997)). These references are incorporated herein by reference for details of LPG construction. However, other methods may also be used. For example, microbend induced LPGs are suitable. These can be realized with acousto-optic gratings, arc-splicer induced periodic microbends, or by pressing the fiber between corrugated blocks that have the required grating periodicity.

The physical constitution of LPGs is well known. Basically an LPG is similar to the familiar Bragg grating and comprises a length of optical waveguide wherein a plurality of refractive index perturbations are spaced along the waveguide, but the spacing is characterized by a relatively long periodic distance $\Lambda$. Typically $\Lambda$ is at least 10 times larger than the transmitted wavelength, $\lambda$. In the usual case, $\Lambda$ will be in the range 15–1500 micrometers, and the width of a perturbation in the range $\frac{1}{5} \Lambda$ to $\frac{4}{5} \Lambda$. In some applications, such as chirped gratings, the spacing $\Lambda$ will vary along the length of the grating.

In the discussion above reference is made several times to a minima in the phase matching curve, and the figures show a minima in the usual sense. However, it will occur to those skilled in the art that the TAP could as well be a maxima point, or it could be an inflection point, where the slope as well as the second derivative of the curve are both essentially zero. For the purpose of definition herein, the use of the term minima is intended to include the case where the TAP occurs at a maxima or an inflection point. In the former case, a maxima may be shown as a minima by simply inverting the scale.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical mode converter comprising:
    a. a length of optical fiber having a TAP, and having at least a first core-guided mode and a second core-guided mode,
    b. means for converting light in the first core-guided mode to light in the second core-guided mode, said means comprising an LPG in the length of optical fiber, and
    c. means for adjusting the refractive index of at least a portion of the length of optical fiber.

2. The optical mode converter of claim 1 wherein the LPG has a grating period $\Lambda$, and $\Lambda$ corresponds to the TAP to within 5%.

3. The optical mode converter of claim 1 wherein the LPG has a grating period $\Lambda$, and $\Lambda$ corresponds to the TAP to within 0.5%.

4. The optical mode converter of claim 1 wherein the $\Lambda$ of the LPG is at or below the TAP.

5. The optical mode converter of claim 1 wherein the $\Lambda$ of the LPG is above the TAP.

6. The optical mode converter of claim 1 wherein the means for adjusting the refractive index of the length of optical fiber is a means for varying the temperature of the optical fiber.

7. An optical mode converter comprising:
    a. a length of optical fiber having a TAP, and having at least a first core-guided mode and a second core-guided mode,
    b. means for converting light in the first core-guided mode to light in the second core-guided mode, said means comprising an LPG in the length of optical fiber, the LPG having a grating period $\Lambda$, and
    c. means for adjusting the $\Lambda$ of the LPG.

8. The optical mode converter of claim 7 wherein the LPG has a grating period $\Lambda$, and $\Lambda$ corresponds to the TAP to within 5%.

9. The optical mode converter of claim 7 wherein the LPG has a grating period $\Lambda$, and $\Lambda$ corresponds to the TAP to within 0.5%.

10. The optical mode converter of claim 7 wherein the $\Lambda$ of the LPG is at or below the TAP.

11. The optical mode converter of claim 7 wherein the $\Lambda$ of the grating period of the LPG is above the TAP.

12. The optical mode converter of claim 7 wherein the means for adjusting the $\Lambda$ of the LPG is a means for changing the strain on the length of optical fiber.

\* \* \* \* \*